(12) United States Patent
Martin

(10) Patent No.: US 12,714,925 B2
(45) Date of Patent: Aug. 25, 2026

(54) METHOD AND SYSTEM OF BUILDING A GOLF PUTTER FOR SEEKING THE FACE SQUARE

(71) Applicant: L.A.B. Golf Company LLC, Creswell, OR (US)

(72) Inventor: Kevin Martin, Coburg, OR (US)

(73) Assignee: L.A.B. Golf Company LLC, Eugene, OR (US)

( * ) Notice: Subject to any disclaimer, the term of this patent is extended or adjusted under 35 U.S.C. 154(b) by 0 days.

(21) Appl. No.: 19/445,129

(22) Filed: Jan. 9, 2026

(65) Prior Publication Data

US 2026/0224955 A1 Aug. 6, 2026

Related U.S. Application Data

(60) Provisional application No. 63/752,004, filed on Jan. 31, 2025.

(51) Int. Cl.
*A63B 60/42* (2015.01)
*A63B 24/00* (2006.01)
(Continued)

(52) U.S. Cl.
CPC .......... *A63B 60/42* (2015.10); *A63B 24/0003* (2013.01); *B25J 18/00* (2013.01);
(Continued)

(58) Field of Classification Search
CPC ....... A63B 60/42; A63B 60/46; A63B 53/007; A63B 53/0487; A63B 2053/0491
See application file for complete search history.

(56) References Cited

U.S. PATENT DOCUMENTS 807,224 A 12/1905 Vaile
1,631,504 A 6/1927 Redman
(Continued)

FOREIGN PATENT DOCUMENTS

GB 727051 A 3/1955
GB 2362832 A 12/2001
(Continued)

OTHER PUBLICATIONS

Machine translation of JP2013052204 (Year: 2013).*
(Continued)

*Primary Examiner* — Brian O Peters
(74) *Attorney, Agent, or Firm* — Manatt, Phelps & Phillips, LLP

(57) ABSTRACT

A method for constructing a balanced, stable, equalized and/or squared golf putter to enhance the accuracy and consistency of use for golfers is disclosed. The method involves installing weight elements into the putter head to achieve a balanced configuration. The putter is placed on a balancer to assess its balance, with adjustments made to the weight elements if necessary. Subsequently, the rotation speed of the putter is measured to ensure it falls within an acceptable range, with further weight adjustments made if the speed is outside the desired parameters. Finally, the putter is placed on a revealer, a device designed to determine whether the clubface is properly aligned. If the putter passes the revealer test, the front-facing region of the clubface is configured to maintain a square alignment during the putting stroke, allowing the golfer to execute the stroke without the need for additional torque or manipulation of the putter. This design reduces the skill required to maintain proper alignment, improving the golfer's performance by promoting a more consistent and natural putting motion.

18 Claims, 5 Drawing Sheets

(51) Int. Cl.
*A63B 53/00* (2015.01)
*A63B 53/04* (2015.01)
*B25J 18/00* (2006.01)

(52) U.S. Cl.
CPC ......... *A63B 53/007* (2013.01); *A63B 53/0487* (2013.01); *A63B 2053/0491* (2013.01); *A63B 2220/807* (2013.01)

(56) References Cited

U.S. PATENT DOCUMENTS 1,703,199 A 2/1929 McClure
2,425,808 A 8/1947 Jakosky
2,820,638 A 1/1958 Morrison
2,843,384 A 7/1958 Schmidt
3,319,962 A 5/1967 Summers
3,459,426 A 8/1969 Sherwood
3,486,755 A 12/1969 Hodge
3,572,709 A 3/1971 Risher
3,574,349 A 4/1971 Kropp
3,625,517 A 12/1971 Durnack
3,655,188 A 4/1972 Solheim
3,679,207 A 7/1972 Florian
3,758,115 A 9/1973 Hoglund
3,762,717 A 10/1973 Johnston
3,954,265 A 5/1976 Taylor
4,010,958 A 3/1977 Long
4,058,312 A 11/1977 Stuff
4,063,733 A 12/1977 Benedict
4,138,117 A 2/1979 Dalton
4,141,556 A 2/1979 Paulin
4,163,554 A 8/1979 Bernhardt
4,240,636 A 12/1980 Swenson
4,269,412 A 5/1981 Hughes
4,310,158 A 1/1982 Hoffman
4,312,509 A 1/1982 Grant
4,324,404 A 4/1982 Dian
4,325,553 A 4/1982 Taylor
4,374,315 A 2/1983 Timbrook
4,426,083 A 1/1984 Dishner
4,746,120 A 5/1988 Mockovak
4,866,979 A * 9/1989 Bernhardt .............. A63B 60/42 73/65.03
4,921,253 A 5/1990 Tesori
4,986,544 A 1/1991 Benson
5,078,398 A 1/1992 Reed et al.
5,133,555 A 7/1992 Bailey
5,160,141 A 11/1992 Crews
5,228,332 A 7/1993 Bernhardt
5,290,035 A 3/1994 Hannon
5,308,068 A 5/1994 Strand
5,333,863 A 8/1994 Shenoha et al.
5,409,220 A 4/1995 Lombardo
5,454,564 A 10/1995 Kronogard
5,460,372 A 10/1995 Cook
5,469,627 A 11/1995 Denny
5,470,070 A 11/1995 Bendo
5,544,879 A 8/1996 Collins
5,551,696 A 9/1996 Izett et al.
5,571,052 A 11/1996 Bolanos
5,588,920 A 12/1996 Soong
5,620,379 A 4/1997 Borys
5,624,329 A 4/1997 Schneebeli
5,662,532 A 9/1997 Mizumura
5,700,207 A 12/1997 Guthrie et al.
5,728,009 A 3/1998 Shanahan
5,749,792 A 5/1998 Engfer
5,782,705 A 7/1998 Solari
5,785,608 A 7/1998 Collins
5,830,075 A 11/1998 Hirose
5,830,082 A 11/1998 White
6,083,115 A 7/2000 King
6,083,123 A 7/2000 Wood
6,152,832 A 11/2000 Chandler, III
6,168,535 B1 * 1/2001 Lu .......................... A63B 60/42 473/409
6,350,208 B1 2/2002 Ford
6,506,128 B1 1/2003 Bloom, Jr.
6,634,956 B1 10/2003 Pegg
6,663,499 B2 12/2003 Riseley
6,786,835 B1 9/2004 Carter
6,966,846 B2 11/2005 Bloom, Jr.
6,988,959 B2 1/2006 Pollman
7,066,829 B1 6/2006 Lister
7,121,954 B2 10/2006 Charron et al.
7,125,341 B1 10/2006 D'Eath
7,306,526 B2 12/2007 Baek
7,407,445 B2 8/2008 Pedraza et al.
7,494,422 B2 2/2009 Pegg
7,524,247 B2 4/2009 Williams
7,635,310 B2 12/2009 Keough
7,691,004 B1 4/2010 Lueders
8,096,893 B2 1/2012 Ferris
8,734,266 B2 5/2014 David
8,858,356 B2 10/2014 Chu et al.
8,932,148 B2 1/2015 Presse, IV et al.
9,017,183 B1 4/2015 Ambrose
9,044,655 B1 6/2015 Hanson
9,233,280 B2 1/2016 Presse, IV et al.
9,415,291 B2 8/2016 Ota
9,421,439 B2 8/2016 McLoughlin
10,052,536 B1 8/2018 Janus
10,682,557 B2 6/2020 Ambrose
11,628,347 B2 4/2023 Ambrose
2001/0031667 A1 * 10/2001 Shiraishi ............. A63B 53/047 473/287
2002/0032074 A1 3/2002 Grieb
2002/0077191 A1 6/2002 Roelke
2002/0098905 A1 7/2002 Riseley
2002/0151376 A1 10/2002 Verne
2003/0046988 A1 * 3/2003 Yamaguchi ............ A63B 53/00 73/65.03
2003/0064822 A1 4/2003 Arvidson
2003/0130058 A1 7/2003 Ferris
2003/0162599 A1 8/2003 Klein
2003/0186755 A1 10/2003 Kitabayashi
2003/0199332 A1 10/2003 Lindsay
2003/0211900 A1 11/2003 Novak
2003/0220149 A1 11/2003 Mills
2003/0228926 A1 12/2003 Wang
2003/0236128 A1 12/2003 Jackson
2004/0259655 A1 12/2004 Ferris
2005/0020381 A1 1/2005 Yamaguchi et al.
2005/0049066 A1 3/2005 Schweigert
2005/0049076 A1 3/2005 Schweigert et al.
2005/0137028 A1 6/2005 Lukasiewicz
2005/0215348 A1 9/2005 Baek
2005/0239573 A1 10/2005 Moriyama
2005/0282656 A1 * 12/2005 Davis .................... A63B 60/02 473/340
2006/0009305 A1 1/2006 Lindsay
2006/0068929 A1 3/2006 Goldfader
2006/0142094 A1 6/2006 McCracken
2006/0156514 A1 7/2006 Lewis
2006/0199663 A1 9/2006 Lister
2006/0264264 A1 11/2006 Sandino
2006/0281578 A1 12/2006 Pedraza
2006/0287130 A1 12/2006 Allen
2007/0026959 A1 2/2007 Boone
2008/0058115 A1 3/2008 Bengtson
2008/0293513 A1 11/2008 Bitko et al.
2008/0305880 A1 12/2008 Brown
2008/0305885 A1 12/2008 Kinney
2009/0017936 A1 1/2009 Sato et al.
2009/0069110 A1 3/2009 Schmidt
2009/0186718 A1 7/2009 Ross
2009/0227387 A1 9/2009 Pontius
2009/0247315 A1 10/2009 Kossowsky
2010/0083518 A1 4/2010 Kramski
2010/0160062 A1 6/2010 Teramoto
2010/0160075 A1 6/2010 Dawson
2010/0298065 A1 11/2010 Soracco et al.
2011/0065525 A1 3/2011 Johnson

(56) References Cited

U.S. PATENT DOCUMENTS

| | | | |
|---|---|---|---|
| 2011/0086731 | A1 | 4/2011 | Todd |
| 2011/0183773 | A1 | 7/2011 | Cameron |
| 2011/0294592 | A1 | 12/2011 | Guerriero |
| 2012/0034990 | A1 | 2/2012 | Cohen et al. |
| 2012/0196696 | A1 | 8/2012 | Guerriero |
| 2012/0214610 | A1 | 8/2012 | Parsons |
| 2012/0283034 | A1 | 11/2012 | Morton |
| 2013/0130825 | A1 | 5/2013 | McLoughlin |
| 2013/0203514 | A1 | 8/2013 | Chu |
| 2013/0210539 | A1 | 8/2013 | Baumann |
| 2013/0225306 | A1 | 8/2013 | David |
| 2013/0331197 | A1 | 12/2013 | Hackenberg |
| 2014/0045602 | A1 | 2/2014 | Dingman |
| 2014/0148267 | A1 | 5/2014 | Pitbladdo |
| 2014/0200097 | A1 | 7/2014 | Chu |
| 2014/0213385 | A1 | 7/2014 | Chu |
| 2014/0315655 | A1 | 10/2014 | Presse, IV et al. |
| 2014/0315656 | A1 | 10/2014 | Presse, IV et al. |
| 2014/0349775 | A1 | 11/2014 | Davis |
| 2015/0045135 | A1 | 2/2015 | Patel |
| 2015/0182823 | A1 | 7/2015 | Hsu |
| 2015/0196813 | A1 | 7/2015 | Chu |
| 2015/0209626 | A1 | 7/2015 | Klein et al. |
| 2015/0251064 | A1 | 9/2015 | Chapin |
| 2015/0258390 | A1 | 9/2015 | Defrancesco, Jr. |
| 2015/0265890 | A1 | 9/2015 | Presse, IV |
| 2015/0367174 | A1 | 12/2015 | Okazaki |
| 2016/0082329 | A1 | 3/2016 | Kammerer |
| 2016/0096087 | A1 | 4/2016 | Sussich |
| 2016/0107052 | A1 | 4/2016 | Wang |
| 2016/0175665 | A1 | 6/2016 | Presse, IV |
| 2016/0339310 | A1 | 11/2016 | Goldfader |
| 2017/0087430 | A1 | 3/2017 | Ambrose |
| 2017/0225046 | A1 | 8/2017 | Foster |
| 2018/0021635 | A1 | 1/2018 | Lewis |
| 2018/0290033 | A1 | 10/2018 | Rife |
| 2020/0298057 | A1 | 9/2020 | Wycoff |
| 2021/0077883 | A1 | 3/2021 | Irvin |
| 2021/0154550 | A1 | 5/2021 | Presby |
| 2022/0288469 | A1 | 9/2022 | Liu |
| 2023/0191208 | A1 | 6/2023 | Presse, IV |
| 2023/0233914 | A1 | 7/2023 | Cameron |
| 2025/0018260 | A1 | 1/2025 | Wilson |
| 2025/0032869 | A1 | 1/2025 | Cavill |
| 2025/0099819 | A1 | 3/2025 | Sood |

FOREIGN PATENT DOCUMENTS

| | | | | |
|---|---|---|---|---|
| JP | 2581577 | B2 | * | 2/1997 |
| JP | 2013052204 | A | * | 3/2013 |
| WO | 9217247 | A1 | | 10/1992 |
| WO | 2007023693 | A1 | | 3/2007 |
| WO | 20090005439 | A1 | | 1/2009 |
| WO | 2012010609 | A1 | | 1/2012 |

OTHER PUBLICATIONS

Machine translation of JP2581577 (Year: 1997).*

Extended European Search Report (EESR) for EP Application No. EP 14785657, dated Nov. 15, 2016.

International Search Report (ISR) for PCT Application No. PCT/IB2014/060782, dated Aug. 21, 2014.

* cited by examiner

METHOD AND SYSTEM OF BUILDING A GOLF PUTTER FOR SEEKING THE FACE SQUARE

RELATED APPLICATIONS

This application claims the benefit of, and priority to, U.S. Provisional Application No. 63/752,004, filed on Jan. 31, 2025, which is hereby incorporated herein by reference in its entirety.

BACKGROUND

This disclosure relates generally to a method and system of building and/or assembling a golf putter. More particularly, this disclosure relates to a method and system of a building and/or assembling process of a golf putter designed to enhance a golfer's performance through improved balance, alignment and/or minimize torque during the putting stroke.

Golfers often struggle with maintaining proper alignment and balance while executing a putt. Traditional putters can require significant effort to achieve a square clubface at impact, leading to inconsistent performance. We have determined that there is a need for a putter that simplifies the putting process while ensuring accurate alignment is evident.

SUMMARY

Accordingly, we have determined that there is a need for building, assembling, and/or providing a golf putter that enhances the golfer's experience by promoting a naturally square clubface position during the putting stroke. This is achieved through an innovative building process for golf putters.

In some embodiments, a process is provided that includes installing weight elements into the putter head to achieve a balanced configuration. The putter is placed on a balancer to assess the putter's balance, with adjustments made to the weights if necessary. Subsequently, the rotation speed of the putter is measured to ensure it falls within an acceptable range, with further weight adjustments made if the rotation speed is outside the desired range. The putter is then placed on a revealer, a device designed to assess the alignment of the clubface. When the revealer is swung, the putter is considered properly aligned if the front-facing part of the clubface remains square or substantially square throughout the motion. A regulator can be used to control the swing of the revealer, ensuring consistent or substantially consistent results from build to build.

If a putter passes the revealer test, it is configured to maintain a square or substantially square alignment during the putting stroke, allowing the golfer to execute the stroke without the need for additional torque or manipulation of the putter and/or without the putter face moving or rotating in a substantial manner. This configuration can reduce the skill required to maintain a substantially proper alignment, likely improving the golfer's performance by promoting or enabling a substantially more consistent and natural putting motion. Overall, this golf putter aims to provide improved stability and accuracy, potentially enhancing the golfer's performance on the green for golfers that experience difficulty in putting when the face of the putter rotates due to torque from the swing and/or other factors.

BRIEF DESCRIPTION OF THE DRAWINGS

These and other features, aspects and advantages are described below with reference to the drawings, which are intended to illustrate but not to limit the invention. In the drawings, reference characters denote corresponding features consistently throughout similar embodiments.

DETAILED DESCRIPTION

Figure 1:
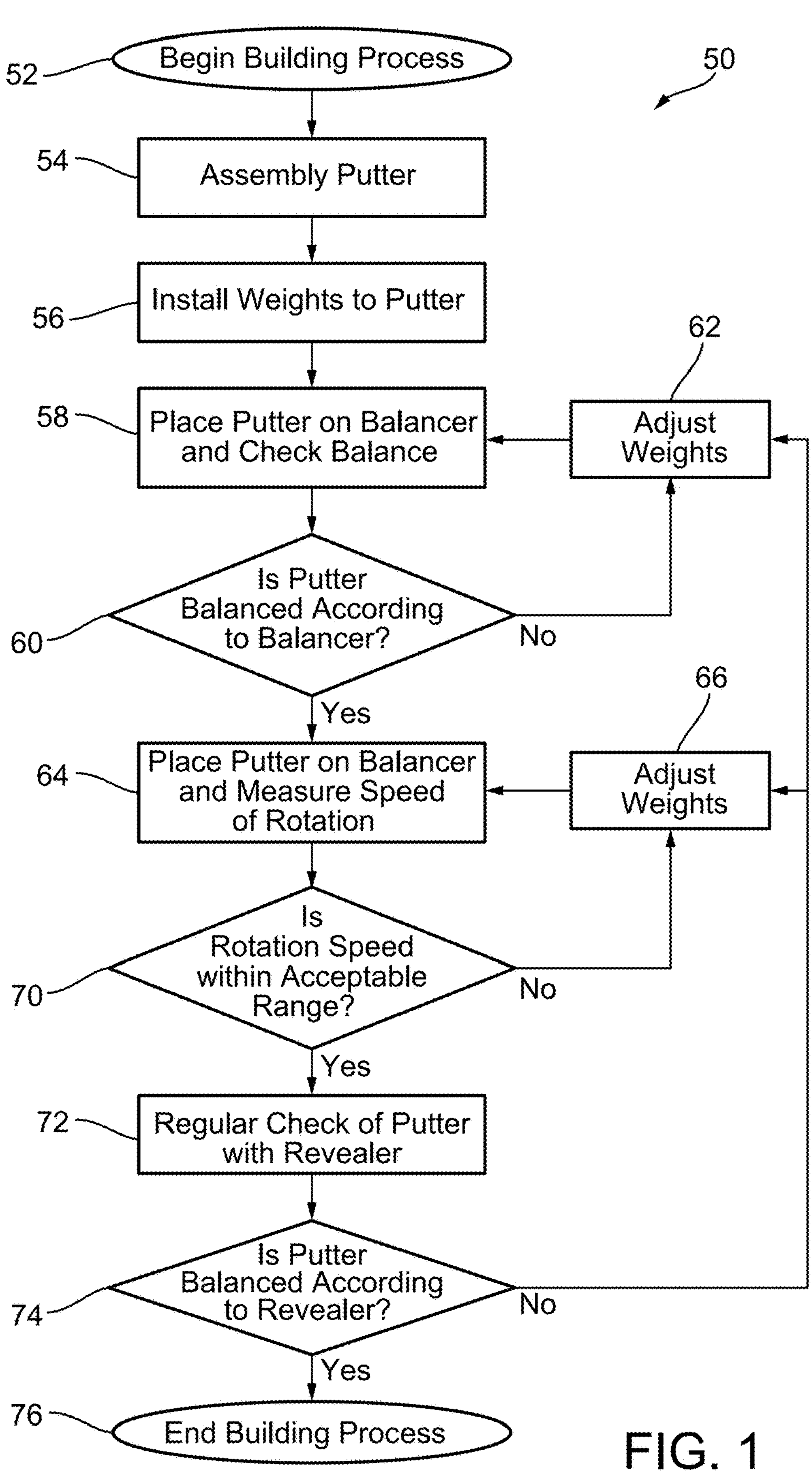
FIG. 1 illustrates a flow chart of an exemplary building process for a golf putter.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the design of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above processes are also contemplated. For example, further insubstantial approximations of the process and/or algorithms are also considered within the scope of the processes described herein.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

FIG. 1 illustrates a flow chart of an exemplary building process 50 for the balanced, stable, equalized and/or squared golf putters according to the present disclosure. A golf putter is a specialized golf club for making short, low-speed strokes aimed at rolling the ball into the hole. A putter is typically used at close range on the putting green, though it can also be effective on fringes and roughs near the green.

While the focus here is on putters, the principles described herein can apply, in some embodiments, to other golf clubs, e.g., irons or woods.

Figures 2, 3:
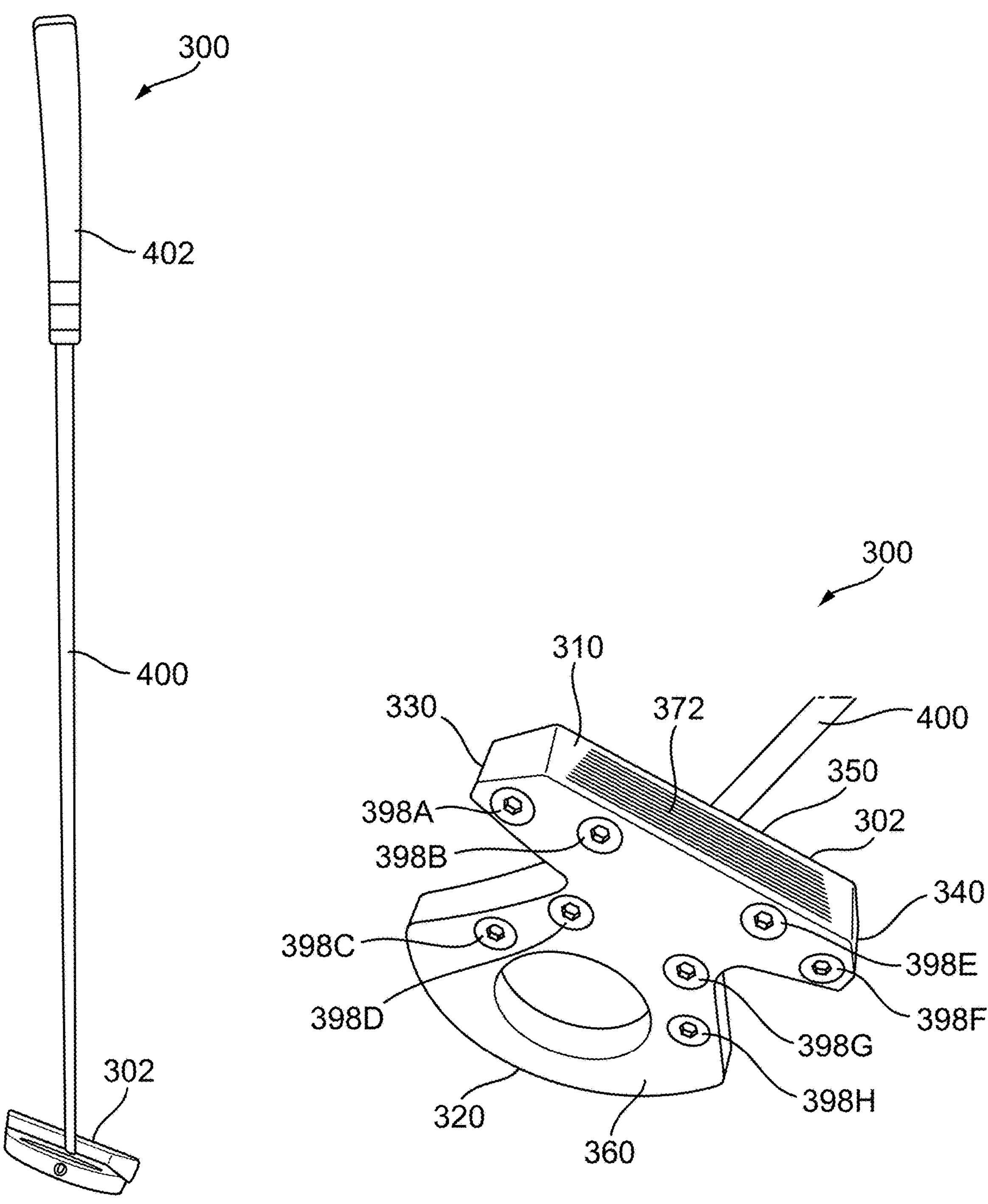
FIG. 2 illustrates a side view of an exemplary golf putter.
FIG. 3 illustrates a bottom perspective view of the exemplary golf putter of FIG. 2 focusing on the putter head without showing the shaft in full length.

Referring also to FIGS. 2-3, the exemplary golf putter 300 as shown and described herein is a balanced, stable, equalized and/or squared golf putter. The golf putter 300 includes a putter head 302 which may have a front side 310, a rear side 320 opposite to the front side 310, a toe side (or right side) 330, a heel side (or left side) 340 opposite to the toe side 330, a top side 350, and a sole side (or bottom side) 360 opposite to the top side 350. In some embodiments, when a golf putter is assembled, a shaft 400 is installed in the putter head with, for example, epoxy into a machined hosel bore or other manner to connect the shaft to the hosel. A grip 402 can be installed with standard grip tape.

In some embodiments, the sole side 360 of the putter 300 can be provided with one or more weight slots. In some embodiments, each of the weight slots can have a circular, for example, recess with threads or grooves configured to accommodate weight elements 398A-398H, respectively. In some embodiments, each of the weight elements 398A-398H can be individually installed into or removed from the weight slots, for example, by screwing, to provide balance to the putter 300. Accordingly, adhesive material, such as epoxy, is not required for installing the weight elements.

In other embodiments, some or all weight slots (and weight elements) can be provided on other parts of the putter, for example, the top side 350 of the putter. In other embodiments, more than eight weight elements are installed if necessary. In yet other embodiments, less than eight weight elements can be installed, for example, specific layout of the putter or no enough area.

In some embodiments, the weight of each of the weight elements 398A-398H is in the range of approximately 2.5 g to approximately 18 g. Alternatively, the weight of each of the weight elements 398A-398H can be different or pairs of the weight elements can be of similar weight or different weight. In some embodiments, the weight elements 398A-398H are made of one, or a combination, of the following: steel, cast iron, lead, tungsten, or other materials.

In some embodiments, weight slots are arranged such that some weight elements 398A-398D are located closer to the toe side 330 (and further away from the heel side 340), while other weight elements 398E-398H are located closer to the heel side 340 (and further away from the toe side 330). In addition, some weight elements 398A, 398B, 398E, 398F are located closer to the front side 310 (and further away from the rear side 320), while other weight elements 398C, 398D, 398G, 398H are located closer to the rear side 320 (and further away from the front side 310).

With the example of the layout arrangements shown in FIG. 3, weight elements 398A-398B are located at a front-toe region, weight elements 398C-398D are located at a rear-toe region, weight elements 398E-398F are located at a front-heel region, and weight elements 398G-398H are located at a rear-heel region. The front-toe region and the rear-heel region are diagonal to each other. In addition, the front-heel region and the rear-toe region are diagonal to each other.

The innovative putter 300 allows or enables the clubface to seek or maintain a substantially square position automatically or naturally during the putting stroke, for example, before and/or after striking the golf ball. This feature minimizes or reduces the rotation of the club putter face, thereby reducing the need for additional torque or adjustments from the golfer, resulting in a smoother, more consistent putting motion. As the golfer prepares to putt, the unique configuration helps maintain the proper alignment of the clubface with minimal effort, thereby enhancing overall performance.

The exemplary building process 50 for a golf putter can be performed by a person (hereafter "builder") with the help of a variety of tools. For example, the following tools can be used to perform the exemplary build process 50: a balancer 500, a carpenter square (not shown), a stopwatch (not shown), a revealer 600, and a regulator (not shown). Other tools (e.g., image sensors, computers, display, computer software, etc.) can also be employed during the building process 50. In some embodiments, one or more steps of the building process can be performed by a computer-controlled process as described below.

In step 54, the builder and/or computer system can start the building process 50 by assembling a golf putter, for example, the exemplary golf putter 300 shown in the drawings or any other putters with balanced, stable, equalized and/or squared capability. A golf putter typically consists of a head, a shaft, and a grip. The shaft can be a long, cylindrical part that connects the putter head to the grip. In some embodiments, the shaft can be inserted into a hosel, which is the part of the putter head designed to hold the shaft. The hosel bore refers to the hole or cavity in the putter head that is machined to precisely fit the shaft. In some embodiments, once the shaft is aligned with the hosel, it is bonded or secured in place using, for example, an epoxy, a type of strong adhesive. The process typically involves applying the epoxy to the shaft's end or inside the hosel, inserting the shaft into the bore, and allowing the epoxy to cure or harden. In some embodiments, the shaft is connected directly to the putter head using standard connection techniques.

To ensure a tight and precise fit between the shaft and the hosel, the hosel bore can be machined, which involves using specialized tools, for example, a computer numerical control (CNC) machine to precisely shape the hole in the putter head, ensuring it matches the dimensions of the shaft being inserted and resulting in well alignment, durability, and preventing or minimizing the shaft from loosening over time.

After the shaft is installed in or to the putter head, the next step can be attaching the grip at the other end of the shaft. A grip is the part the golfer holds while using the putter. To install the grip, an adhesive grip tape can be applied to the surface of the shaft, covering the portion where the grip will be attached. The grip tape helps create a strong bond between the shaft and the grip, preventing the grip from slipping or rotating during use.

In some embodiments, a cross-sectional view of the grip may, for example, be circular, square, elliptical, rectangular, or other shapes. The shape may have one or more flat sides or be a shape that is generally stretched. An elongated shape provides a cross section of the grip with a first dimension along a first axis being relatively longer than a second dimension along a second axis that is generally perpendicular to the first axis.

Alternatively, the builder can skip the assembling process 54 and just proceed by taking a largely assembled golf putter to continue the building process 50.

In step 56, weight elements can be installed by, for example, screwing weight elements into the putter head. Weight elements can be adjusted for the putter to seek balance. In addition, weight elements can be adjusted to change the speed of rotation of the putter. It is understandable that each type of golf putter can have a different layout that the number of weight slots and the locations of weight slots can be arranged in different configurations. However, the method disclosed herein can be applied to all types of golf putters with weight elements installed.

In some embodiments, a robotic arm, or other tools such as CNC machines, can be used to install or adjust weight elements onto the head of the putter. These installations or adjustments can be done according to predetermined weight distribution settings or based on measurement results of balance check or rotating speed to ensure proper weight installations.

Figure 4:
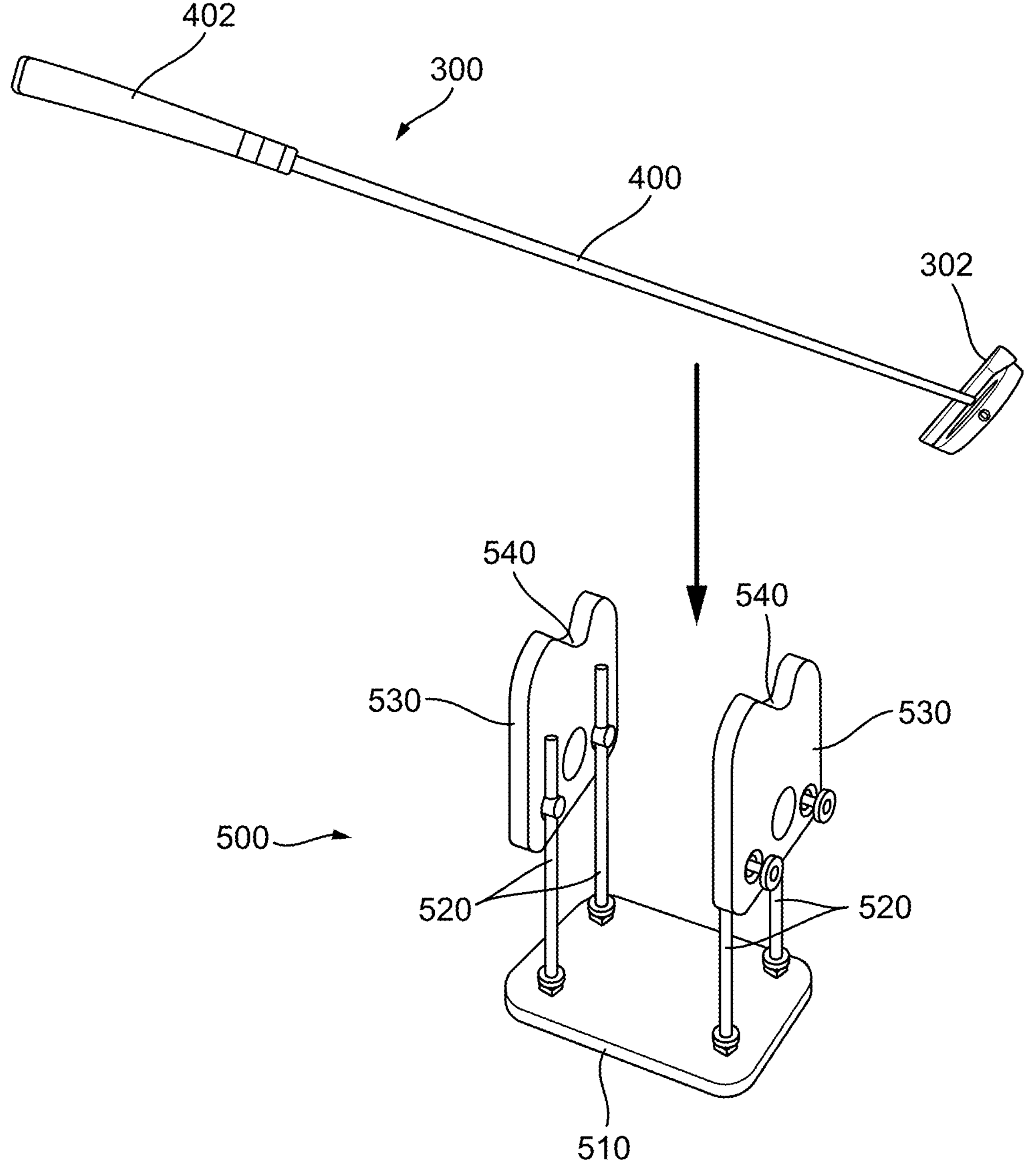
FIG. 4 illustrates perspective view of an exemplary balancer configured to hold the shaft of the exemplary golf putter of FIG. 2 for assessing the balance of the golf putter and for measuring the rotation speed of the golf putter.

Referring also to FIG. 4, after threading weight elements into the golf putter, the builder can set the putter 300 onto a balancer 500 (step 58). In some embodiments, the balancer 500 as shown here is a modified remote-controlled (RC) airplane propeller balancer. A remote-controlled airplane propeller balancer is a device or tool used to measure and correct the balance of a propeller in a remote-controlled airplane. A modified remote-controlled airplane propeller balancer 500 used herein can have a base 510 with one or more pillars 520 extended from the base. In some embodiments, the pillars 520 can be substantially the same height. On top of each of the pillars 520 can have a holder 530 with a notch or hook 540 for holding the shaft 400 of the putter 300 under built to verify if the putter is properly balanced.

In step 58, the builder or system can locate the center of mass (or center of gravity) of the putter onto the notch or hook 540 in order to ensure consistency between builds. In order to check the balance, the putter 300 can be placed on the propeller balancer 500 with each of the holder 530 of the propeller balancer holding the shaft 400 of the putter 300. Because the center of mass of the whole putter 300 is closer to the head 302 than the grip 402, in some embodiments, the head 302 is extended approximately 4-6 inches from the propeller balancer 500 when verifying if the putter is properly balanced. Other placements for the head and shaft can alternatively be used.

In other embodiments, instead of using a propeller balancer 500 for checking the balance and rotation speed of the putter, other tools or devices, for example, a simple propeller balancing stand, a modified bike wheel balancer, a digital propeller balancer, or a propeller balancing kit, can also be used for checking the balance and rotation speed of the putter.

Before checking the balance of the putter, the putter 300 can optionally be purposely put in motion (e.g., rotation relatively along the direction of the axis of the shaft) and let the putter rotate or swing freely on the balancer.

In step 60, when the putter comes to a rest, a measurement can be performed to determine where the putter settles in a balanced position (or "face square"). The goal is to have the golf putter balanced in a substantially 90° toe up orientation. In other words, if the putter is in a balanced position, the clubface 372 of the putter 300 forms about a 90° angle with the ground and the toe side 330 of the putter is substantially facing up. In some embodiments, the putter need only be within 5% of the 90° toe up orientation in either direction to be sufficiently in the balanced position. In other embodiments, the putter can be within 10% of the 90° toe up orientation in either direction to be sufficiently balanced or improved.

In some embodiments, a carpenter square can be used to check if the putter 300 is face square. A carpenter square used herein can be a flat, right-triangular piece with its two legs forming a substantially 90° angle or another compatible angle, e.g., within 5% or 10% of the 90° angle. To check if the putter 300 is balanced or face square, the builder or system can place one leg (horizontal leg) of the carpenter square along the surface, for example, a table, where the base 510 of the balancer 500 is placed, while the other leg (vertical leg) of the carpenter square is sliding toward the clubface 372 of the putter 300 with the horizontal leg maintaining on flashing with the surface. In some embodiments, if the clubface 372 of the putter 300 is substantially flush (e.g., the gap is a few millimeters, or the gap is less than 5 millimeters) with the substantially vertical leg of the carpenter square, the putter 300 is considered substantially balanced or substantially face square. If there is a gap between the vertical leg of the carpenter square and the clubface 372 of the putter 300, the putter 300 is not balanced or face square. Alternatively, some minor gaps can be considered acceptable when determining whether the putter is considered substantially balanced or substantially face square.

Other tools can also be used to measure if the clubface of the putter is square or not. In some embodiments, a triangular ruler, a speed square, a laser square, a protractor square, or a digital angle finder can be used to check if the putter is substantially face square.

In some embodiments, a computer assisted tool can be used to determine whether the golf putter is properly balanced. For example, a coordinate measuring machine, a digital micrometer, an optical profiler, etc., can be used to determine whether the golf putter is properly balanced.

If the golf putter is substantially balanced or substantially face square, the process continues to step 64. However, if the golf putter is not balanced, the process continues to step 62 to adjust weight elements.

In step 62, in some embodiments, each of the weight elements can be individually screwed into or out of the weight slots to provide balance to the putter 300. In some embodiments, the total weight of weight elements near the toe side is substantially the same as the total weight of weight elements near the heel side. For example, if the weight of any of the weight elements near the toe side is increased, the weight in one or more of the rests of the same group should be decreased. In other embodiments, the weight elements can have complimentary or other weights depending on the putter to assist in the balancing process.

In golf putting, the terms open, closed, and square can be referred to the alignment of the putter face relative to the target line at address and impact. When the putter face is perfectly aligned with the target line (square), this is the ideal position for accurate putting, as it ensures that the ball will start on the intended line. However, if the putter face is angled away from the target line (open) or angled toward the target line (closed), the ball could be sent to the start right (open) or the start left (closed) of the target line for a right-handed golfer.

By adjusting the weight of one or more of the weight elements, a toe hang can be created to aid alignment of a swing path. The inventors have established a set of guiding principles that when a weight is added to the front side 310 of the putter (or when a weight is reduced to the rear side 320 of the putter), the putter head will close. In addition, when a weight is added to the rear side 320 of the putter (or when a weight is reduced to the front side 310 of the putter), the putter head will open. Thus, the builder or system can adjust the putter face alignment by adding or taking away weight at one or more specific weight elements.

In some embodiments, increasing weight to the front side weight elements 398A-398B (and/or decreasing weight to the rear side weight elements 398C-398D) will close the putter head. In some embodiments, increasing weight to the rear side weight elements 398C-398D (and/or decreasing weight to the front side weight elements 398A-398B) will open the putter head. In some embodiments, increasing weight to the front side weight elements 398E-398F (and/or decreasing weight to the rear side weight elements 398G-398H) will close the putter head. In some embodiments, increasing weight to the rear side weight elements 398G-398H (and/or decreasing weight to the front side weight elements 398E-398F) will open the putter head.

Once the weight elements are adjusted in step 62, the process continues in step 58 to check the balance one more time.

In step 64, the rotation speed or angular acceleration of the putter is measured. In order to check the speed of rotation, the putter 300 can again be placed on the propeller balancer 500 with the notch or hook 540 of the propeller balancer 500 holding the shaft 400 of the putter 300 under built. The speed of rotation is the rate at which the putter rotates along the direction of the axis of the shaft of the putter when the putter is placed on the propeller balancer or other suitable device or system that allows or enables the rotation of the putter axis. In some embodiments, the putter can be purposely put in motion (i.e., rotation relatively along the axis of the shaft) and let the putter swing freely.

The builder or system can rotate the putter and measure how long it takes for the putter to rotate for a certain number of turns or partial turn. In some embodiments, a stopwatch is used to measure how long it takes for the putter to rotate twice (two turns). This technique can provide the builder with a visual indication as well as chronological measurement of the torque output of each build and to provide the builder consistency from model to model. In other embodiments, a timing device or system can be used to detect the time and amount of rotation.

In some embodiments, the acceptable range of the rotation speed of the golf putter is approximately 2 turns in 4 to 5 seconds. In other words, the acceptable range of the rotation speed of the golf putter is in the range of 0.4 turns to 0.5 turns per second.

It is understood that some smart phones have built-in stopwatch applications that can provide precise timing. In other embodiments, a high-speed camera can also be used to visually measure and analyze the motion of the putter while it is spinning. Other tools, for example, digital watches, video recording devices, a rotation camera system, etc., can also be used for measuring the rotation speed of the putter.

In some embodiments, the rotation speed (or angular velocity) of the golf putter can be measured by a computer assisted tool. For example, a tachometer, an optical displacement sensor, a potentiometer, strobe lights, etc., can be used to measure the rotation speed of the putter along the axis of the shaft.

In step 70, if the rotation speed measured in step 64 is within an acceptable range, the process continues to step 72. However, if rotation speed measured in step 64 is not within the acceptable range, the process continues to step 66 to adjust the weight elements.

In step 66, the golf putter's speed of rotation along the direction of the axis of the shaft can be changed by adding or subtracting weight from the toe and heel of the putter. The inventors have established a set of guiding principles that when weight is added to the toe side of the putter, the speed of rotation will slow down. In addition, when weight is added to the heel side of the putter, the speed of rotation will be faster. Thus, the builder or system can change the speed of the putter by adding or taking away weight without changing the face angle of the putter.

In some embodiments, increasing weight to any of the toe side weight elements 398A-398D will slow down the speed of rotation of golf putter 300. In some embodiments, increasing weight to any of the heel side weight elements 398E-398H will speed up the speed of rotation of golf putter 300.

Advantageously, the inventors have discovered that when the same amount of weight is added to (or taken away from) two weight elements located at diagonal regions, the face orientation and the speed of rotation of the putter would not be affected. For example, the same or substantially the same amount of weight can be added to (or taken away from) the front-toe weight element 398A and the rear-heel weight element 398H without affecting the speed of rotation and face orientation. As another example, the same or substantially the same amount of weight can be added to (or taken away from) the rear-toe weight element 398C and the front-heel weight element 398F without affecting the speed of rotation and face orientation. The features described can be applied to a situation when a putter is already properly built but the golf player prefers a heavier (or lighter) putter, then the weight adjustment here can be used to change weight of the putter while maintaining substantially the same speed of rotation and face orientation.

Once the weight elements are adjusted in step 66, the process continues in step 64 to check the rotation speed one more time.

Figure 5:
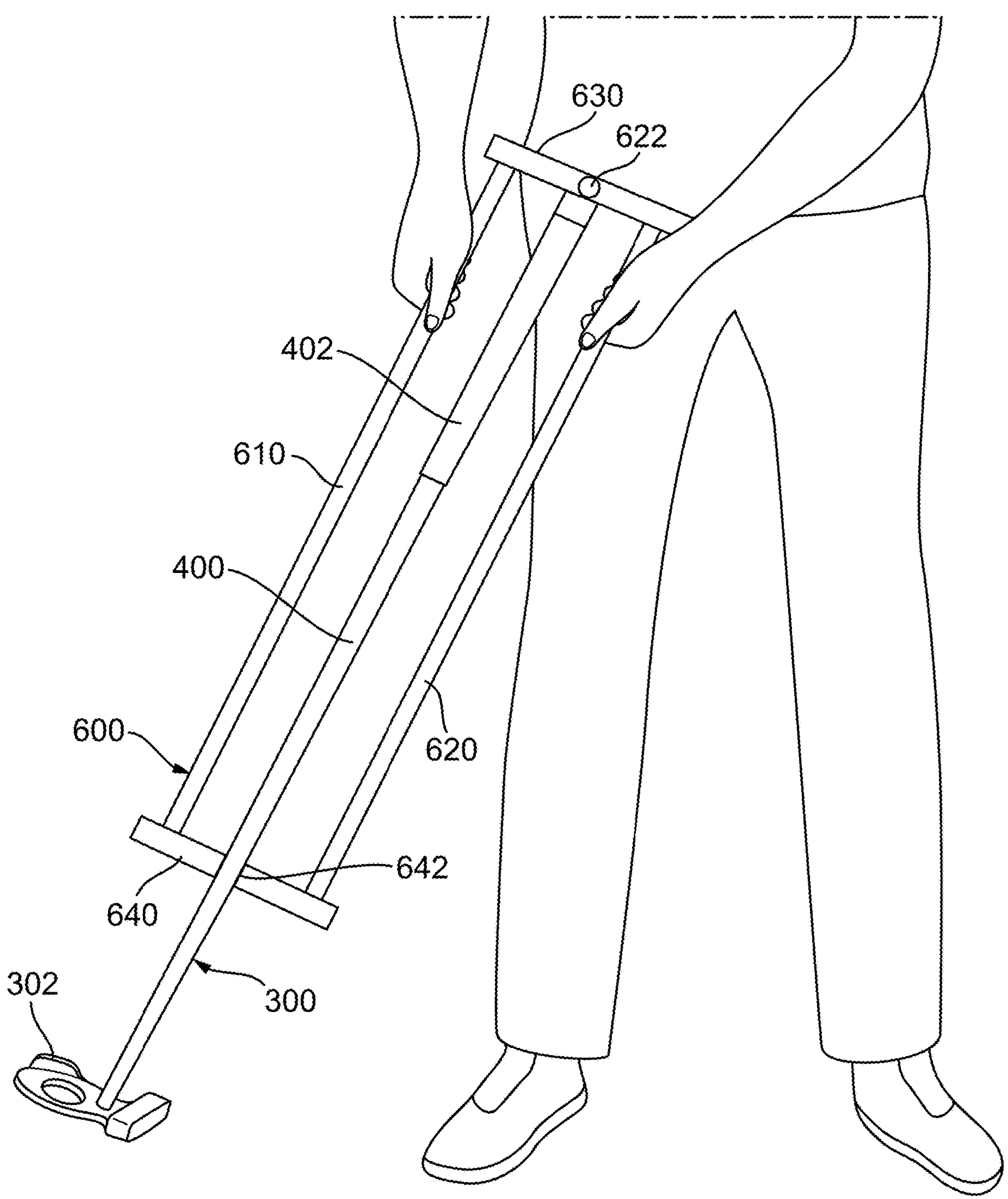
FIG. 5 illustrates a perspective view of an exemplary revealer configured to catch and swing the exemplary golf putter of FIG. 2 with the exemplary revealer held by both hands of a builder for revealing the putter's performance.

Referring also to FIG. 5, in step 72, the putter can be placed at a revealer 600 to determine if the putter 300 reveals by swinging the revealer 600. In other words, the revealer 600 can be used to show if the putter performs in a desirable way or not.

In some embodiments, the revealer 600 has a rectangular-structured frame with two parallel side poles 610, 620, a top bar 630 in connection with high end of each of the parallel side poles 610, 620, and a bottom bar 640, opposing to the top bar 630, in connection with low end of each of the parallel side poles 610, 620.

In some embodiments, side poles 610, 620 of the revealer 600 are made of aluminum or aluminum alloys. In some embodiments, the top bar 630 and the bottom bar 640 are made of plastic, carbon fiber, aluminum alloys, or others.

In some embodiments, a swive0l00 622 with an0 eye hole can be provided approximately at the center of the lower facing portion of the top bar 630 for removably receiving the top end of the grip 402 of the golf putter under test or revealing, while allowing the putter 300 to rotate or spin freely along the direction of the axis of the shaft 400. The top end of the grip 402 of the golf putter under test can have a hook installed for catching the swivel 622 at the top bar of the revealer 600.

Other mechanisms can be used for allowing the golf putter under test to rotate or spin freely along the direction of the axis of the shaft. For example, the swivel installed at the top bar of the revealer and the hook installed at the top end of the putter shaft can be switched so that a hook is installed at the top bar of the revealer and a swivel is installed at the top end of the putter shaft. In other embodiments, the revealer can catch the golf putter under test allowing for 360° rotation by other mechanisms, for example, rotating eye hooks, universal joints, ball-and-socket joints, carabiners or quick-release pins, magnetics, fishing wires, etc.

In some embodiments, a notch 642 is provided at the center of the bottom bar 640 for supporting the golf putter under test or revealing while allowing the putter 300 to spin freely. Thus, a portion of the shaft 400 can be partially surround by the notch 642 on the bottom bar 640 so that the putter head can be rotated or spin freely along the direction of the axis of the shaft. In some embodiments, a felt is provided at the notch to provide some friction yet allowing the putter to spin or rotate adequately.

When in use, the builder can first put the hook (installed at the top end of grip of the putter under test) into the eye hole of the swivel of the revealer so that the putter is allowed to rotate or swing freely along the direction of the axis of the shaft. The shaft of the putter can rest in the notch, and it is free to rotate or spin freely along the direction of the axis of the shaft. The builder can swing the revealer in a way similar to a putter's stroke and check if the putter under test keeps square (goes straight back and straight through) during the stroke. Accordingly, the revealer can provide the builder a visual indication of torque output of the putter from build to build. For a putter to pass the revealer test, the putter's face is expected to stay substantially square and not move at all when the putter is put in the swinging motion. If the putter head moves (spins or rotates along the axis of the shaft) at all, the builder can determine that the putter is not ready, and the speed of rotation can be changed to achieve the desired result.

In some embodiments, instead of using the builder's hands to swing the revealer 600 as shown in FIG. 5, a regulator (not shown) can be configured to make regular swings of the revealer 600. In some embodiments, the regulator is a replacement of the builder's hands that the putter under revealed is caught or held by the revealer while the revealer is caught or held by the regulator. In other embodiments, the putter under revealed is caught directly by the regulator that the regulator plays the roles of the revealer and the builder's hands.

The regulator can be a mechanism or component that controls the motion of the revealer, ensuring the revealer swings back and forth in a consistent, regular manner. In some embodiments, the regulator is an electromechanical regulator that uses sensors, motors, and electronic circuits to create regular oscillatory motions.

In some embodiments, the regulator includes a feedback loop to precisely control the movement of the revealer. In some embodiments, sensors (e.g., position sensors, speed sensors, acceleration sensors) can be used to monitor or track the position (and/or angle) and speed of the swing of the revealer. The sensors can also be used to monitor or track the position and rotation of the putter.

In some embodiments, the position sensor is an encoder or potentiometer used to monitor the position of the revealer and the putter. The position sensors can be used to measure the angular displacement or position in real-time, providing feedback to a control system about how far the revealer and the putter have swung. In some embodiments, the speed sensor is a tachometer, or an optical sensor used to measure the velocity of the swing, giving information about how fast the revealer and the putter are moving. In some embodiments, the acceleration sensor is an accelerometer used to measure the changes in the acceleration of the revealer and the putter, which helps track the swing's movement through its cycle.

In some embodiments, mathematical models can be used to define the revealer's (and the putter's) position, orientation, and trajectory over time. The swing motion of the revealer (and the putter) is similar to the swing motion of a pendulum. In some embodiments, the swing motion of the revealer is mathematically modeled as an oscillatory motion, which can be described using a simple harmonic motion model. The primary factors include an angle $\theta$, an angular velocity @, and an angular acceleration $\alpha$. The angle $\theta$ is the displacement angle of the revealer (and the putter) relative to a vertical axis. The angular velocity ($\omega$) is the rate of change of the angle with respect to time. The higher the angular velocity, the faster the swing. The angular acceleration ($\alpha$) is the rate of change of angular velocity with respect to time.

In some embodiments, the swing motion of the revealer (and the putter) can be governed by the following differential equation of motion:

$$\frac{d^2\theta}{dt^2} + \frac{g+R}{L}\sin(\theta) = 0$$

where $\theta(t)$ is the angular displacement, g is the acceleration due to gravity (9.8 $m/s^2$), R is the acceleration due the regulator's (or the builder's) movement, L is the length of the pendulum, and $d^2\theta/dt^2$ is the angular acceleration.

In some embodiments, the length of the pendulum L is approximately the distance between the regulator and the putter head. It is understandable that the average length of a person's arm is around 25 inches (64 cm). It is also understandable that the length of a putter is in the range of 33 inches to 36 inches (84 cm to 91 cm). In some embodiments, the length of the pendulum L is in the range of 58 inches to 61 inches (148 cm to 155 cm) to emulate the distance between a golfer's shoulder to the putter's head. In order to emulate a typical putter's full swing (including backswing and down-swing) of approximately one second per swing, in some embodiments, the solution to the above differential equation gives the acceleration R in the range of about 1.5 $m/s^2$ to 2.5 $m/s^2$.

The tracked position and speed information of the revealer and the putter can be used to adjust the regulator's motor power output to maintain a steady, consistent swing. In some embodiments, the regulator generates a complete swing encompassing an approximate arc of 70°, executed within a time frame of approximately one second.

In some embodiments, instead of using the builder's eyes to check the performance of the putter, one or more image capture devices (e.g., high-speed cameras, optical motion capture systems, sports and adventure cameras, etc.) can be used to capture the motions of the revealer and the putter. The data captured from the image capture devices can be transmitted in real-time to a computer for analysis.

In some embodiments, computer vision algorithms can be used to calculate the position, velocity, and trajectory of the revealer and the putter in real-time.

In some embodiments, a visual indicator or LCD display can be used to display the results or statistics of the swing performed by the putter. For example, a "pass" can be displayed on the visual indicator if the putter passes the revealer test and a "fail" can be displayed on the visual indicator if the putter does not pass the revealer test. In some embodiments, the putter is considered revealed if the putter's face keeps square during the swing. In some embodiments, the putter is considered revealed if the putter's face is within an allowable condition during the swing. In some embodiments, the allowable condition is that the putter face is forming an angle with the direction of swing in the range of 89°–91° during swing. In some embodiments, the swing range can be a few degrees above or below 90°. In some embodiments, the swing range can be from 85° to 95°. In some embodiments, the visual indicator is connected with the regulator and/or the computer by Bluetooth communication.

In some embodiments, an audio indicator, e.g., a buzzer or alarm could be on if the putter does not pass the revealer test.

After the revealing test by the regulator, a detailed report can be generated summarizing the putter's swing performance, indicating whether it met the predefined parameters or failed.

In step 74, if the revealer test in step 72 is acceptable, the process continues at step 76. However, if the revealer test in step 72 is not acceptable, the process continues to step 62 or step 66 to adjust the weight elements based on the outcome of the revealer test.

In step 76, the weights can be checked one last time to confirm if they are within reasonable range. After confirmation, the weights can be fixed into the putter by applying adhesives, sealants, and/or surface treatments. For example, thread-locking compounds can be applied on each slot before dropping the weights in. In some embodiments, alcohol can be sprayed on the putter head to remove any excess thread-locking compounds. In some embodiments, the putter's head is anodized, chrome-plated, or coated for durability, corrosion resistance, and aesthetic appeal.

Figure 6:
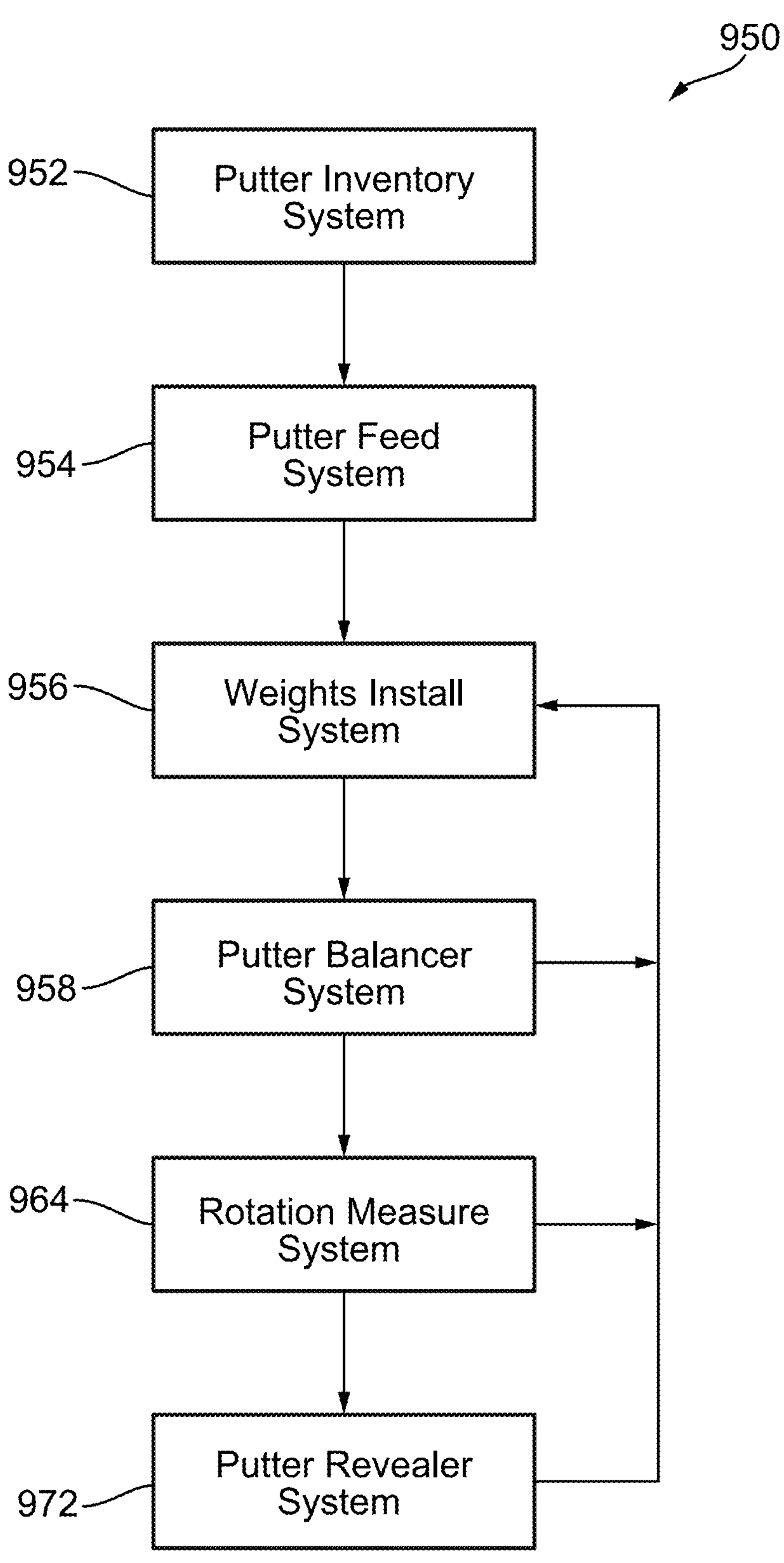
FIG. 6 illustrates a flow chart of another exemplary building process for a golf putter.

FIG. 6 illustrates a flow chart of another exemplary building process 950 for a golf putter.

In some embodiments, the putter inventory system 952 is configured to manage and track the availability, specifications, and status of golf putters within a specific collection or retail environment for efficiently organizing and monitoring putters, ensuring that customers or users can easily access the desired putter models and configurations.

In some embodiments, the putter feed system 954 is configured to automate and streamline the distribution or delivery of putters to customers or users based on specific needs or requests.

In some embodiments, the weights install system 956 is configured to install a plurality of weights at predetermined locations within the putter head. The weights are strategically placed to modify the center of gravity of the putter, thereby influencing its balance and stability. The system ensures that the weights are positioned in a manner that optimizes the putter's performance, offering enhanced control and consistency during the putting stroke.

In some embodiments, the putter balancer system 958 is configured to perform a balancing operation to determine whether the putter is properly balanced. By analyzing the face of the putter head, the balancer system ensures that the putter is well-aligned for stable movement and consistent performance. The system may utilize sensors or other mechanisms to assess whether the putter's weight and balance meet predefined criteria for optimal use.

In some embodiments, the rotation measure system 964 is configured to assess the rotational speed and behavior of the putter. This system helps measure how the putter rotates during test, providing valuable data on its dynamic stability and response during the putting stroke. By analyzing the putter's rotational speed and behavior, the system ensures that the putter performs in a controlled manner, minimizing unwanted twists or shifts during the stroke.

In some embodiments, the putter revealer system 972 is configured to provide visual or sensory feedback regarding the characteristics of the putter. This feedback can include information such as any imbalance detected in the putter. The system may display these characteristics through visual indicators, such as lights or screens, or provide sensory cues such as vibrations or sounds, allowing the user to understand the performance characteristics of the putter. This feedback enables the user to adjust the putter's configuration to ensure that it meets their personal preferences and performance requirements.

The build processes 50, 950 described herein can ensure the consistency and quality of the putters. In addition, the build process described herein can increase efficiency and speed of the build process, while creating repeatable and predictable methods for balancing putter.

Golfers using putter 300 described herein will benefit from increased confidence and reduced mental load during their putting stroke. The ergonomic design promotes a natural hand position and stroke mechanics, allowing for better focus on the target and improved accuracy. The mechanism allows for improved stability during the putting stroke, reducing the likelihood of misalignment. The configurations of the putter 300 minimizes variability in performance, promoting a more consistent outcome with each stroke. The natural alignment of the clubface 372 reduces the need for conscious adjustments, allowing golfers to focus on their technique and the target.

Golf putter 300 represents a significant advancement in golf equipment configurations, addressing common challenges faced by golfers during putting. With its innovative features and ergonomic configurations, this putter 300 not only enhances performance but also improves the overall enjoyment of the game. Through the integration of a thoughtfully engineered putter head and shaft assembly, the invention provides golfers with a reliable tool that promotes accuracy and consistency on the green.

As used in the specification and the claims, the phrase "configured to" denotes an actual state of configuration that fundamentally ties recited elements to the physical characteristics of the recited structure. As a result, the phrase "configured to" reaches well beyond merely describing functional language or intended use since the phrase actively recites an actual state of configuration.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

For example, the specific sequence of the above-described process may be altered so that certain processes are conducted in parallel or independent, with other processes, to the extent that the processes are not dependent upon each other. Thus, the specific order of steps described herein are not to be considered implying a specific sequence of steps to perform the above-described process. Other alterations or modifications of the above processes are also contemplated. For example, further insubstantial approximations of the above equations are also considered within the scope of the processes described herein.

This disclosure encompasses all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The invention claimed is:

1. A method for building a balanced and/or squared golf putter having a head and a shaft, the method comprising:

installing a plurality of weight elements to the head of the golf putter;

placing the golf putter on a balancer device and determining whether the golf putter is substantially balanced, and when the golf putter is not substantially balanced, adjusting at least one of the plurality of weight elements;

placing the golf putter on the balancer device and measuring a rotation speed along the direction of an axis of the shaft, if the measured rotation speed is not within a predetermined range, adjusting at least one of the plurality of weight elements; and placing the golf putter on a revealer device for a revealer test and determining whether the golf putter passes the revealer test.

2. The method of claim 1 further comprises:

assembling the putter by applying an epoxy to a hosel bore of the head and inserting the shaft into the bore.

3. The method of claim 1, wherein the balancer device is a modified remote-controlled airplane propeller balancer, the balancer device has a base with one or more pillars extended from the base.

4. The method of claim 3, wherein at the step of placing the golf putter on the balancer device and checking whether the golf putter is balanced, the head of the golf putter is extended approximately in the range of 4 inches to 6 inches from the balancer device.

5. The method of claim 1, wherein a carpenter square is used to check if the putter is face square.

6. The method of claim 1, wherein when adding weight to the front side of the putter, the putter head will close and wherein when adding weight to the rear side of the putter, the putter head will open.

7. The method of claim 1, wherein in the step of placing the golf putter on the balancer device and measuring a rotation speed along the direction of an axis of the shaft, the acceptable range of the rotation speed is in the range of 0.4 turns to 0.5 turns per second.

8. The method of claim 1, wherein when adding weight to the toe side of the putter, the rotation speed will slow down and wherein when adding weight to the heel side of the putter, the rotation speed will speed up.

9. The method of claim 1, wherein the revealer has a rectangular-structured frame with two parallel side poles, a top bar in connection with a high end of each of the parallel side poles, and a bottom bar, opposing to the top bar, in connection with a low end of each of the parallel side poles.

10. The method of claim 9, wherein a swivel with an eye hole is provided at the center of the lower facing portion of the top bar for movably receiving a hook installed at the putter.

11. The method of claim 9, wherein a notch is provided at the center of the bottom bar for supporting the golf putter while allowing the putter to spin freely.

12. The method of claim 11, wherein a felt is provided at the notch.

13. The method of claim 1, wherein if the golf putter passes the revealer test, a front-facing region of the clubface element of the balanced and/or squared golf putter is able to seek substantially square during a putting stroke without requiring additional torque from a golf player.

14. A method for building a balanced, stable, equalized and/or squared golf putter having a head and a shaft, the method comprising:

installing a plurality of weight elements to the head of the golf putter;

determining whether the golf putter is substantially balanced using a balancer device, and when the golf putter is not substantially balanced, adjusting at least one of the plurality of weight elements;

measuring a rotation speed along the direction of an axis of the shaft using a balancer device and, if the measured rotation speed is not substantially within a predetermined range, adjusting at least one of the plurality of weight elements; and determining whether the golf putter is substantially revealed using a revealer device, wherein if the golf putter is substantially revealed, a front-facing region of the clubface element of the balanced and/or squared golf putter is able to seek substantially square during a putting stroke.

15. The method of claim 14, wherein the balancer device is a modified remote-controlled airplane propeller balancer, the balancer device has a base with one or more pillars extended from the base.

16. The method of claim 14, wherein the revealer has a rectangular-structured frame with two parallel side poles, a top bar in connection with a high end of each of the parallel side poles, and a bottom bar, opposing to the top bar, in connection with a low end of each of the parallel side poles.

17. The method of claim 16, wherein a swivel with an eye hole is provided at the center of the lower facing portion of the top bar for movably receiving a hook installed at the putter.

18. The method of claim 16, wherein a notch is provided at the center of the bottom bar for supporting the golf putter while allowing the putter to spin freely.

* * * * *